US012572796B2

(12) United States Patent
Barr et al.

(10) Patent No.: US 12,572,796 B2
(45) Date of Patent: Mar. 10, 2026

(54) METHODS AND SYSTEMS FOR GENERATING RECOMMENDATIONS FOR COUNTERFACTUAL EXPLANATIONS OF COMPUTER ALERTS THAT ARE AUTOMATICALLY DETECTED BY A MACHINE LEARNING ALGORITHM

(71) Applicant: Capital One Services, LLC, McLean, VA (US)

(72) Inventors: Brian Barr, McLean, VA (US); Jason Wittenbach, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 1414 days.

(21) Appl. No.: 17/138,890

(22) Filed: Dec. 30, 2020

(65) Prior Publication Data

US 2022/0207353 A1 Jun. 30, 2022

(51) Int. Cl.
| | |
|---|---|
| *G06N 3/08* | (2023.01) |
| *G06N 5/045* | (2023.01) |
| *H04L 9/40* | (2022.01) |

(52) U.S. Cl.
CPC .............. *G06N 3/08* (2013.01); *G06N 5/045* (2013.01); *H04L 63/1416* (2013.01); *H04L 63/1425* (2013.01)

(58) Field of Classification Search
CPC .... G06N 3/08; H04L 63/1416; H04L 63/1425
See application file for complete search history.

(56) References Cited

U.S. PATENT DOCUMENTS

| | | | |
|---|---|---|---|
| 10,825,028 B1 * | 11/2020 | Kramme | ............ G06Q 20/4016 |
| 11,403,538 B1 * | 8/2022 | Verma | .................... G06N 5/045 |
| 2017/0004397 A1 | 1/2017 | Yumer et al. | |
| 2018/0176243 A1 | 6/2018 | Arnaldo et al. | |
| 2018/0248893 A1 | 8/2018 | Israel et al. | |
| 2019/0043126 A1 * | 2/2019 | Billman | .............. G06Q 50/265 |
| 2019/0068627 A1 * | 2/2019 | Thampy | .............. H04L 63/1425 |
| 2020/0151326 A1 | 5/2020 | Patrich et al. | |

(Continued)

OTHER PUBLICATIONS

Seo, Eunbi, Hyun Min Song, and Huy Kang Kim. GIDS: GAN based intrusion detection system for in-vehicle network (Year: 2018).*

(Continued)

*Primary Examiner* — Michelle T Bechtold
*Assistant Examiner* — Matiyas T Maru
(74) *Attorney, Agent, or Firm* — Foley & Lardner LLP

(57) ABSTRACT

Methods and systems are described herein for generating recommendations for counterfactual explanations to computer alerts that are automatically detected by a machine learning algorithm. The methods and systems use an artificial neural network architecture that trains a hybrid classifier and autoencoder. For example, one model (or artificial neural network), which is a classifier, is trained to make predictions. A second model (or artificial neural network), which is an autoencoder, is trained to reconstruct its inputs. As the second model is trained to reconstruct its inputs means, the second model is implicitly trained to determine what in-sample data looks like. By combining these networks and train them jointly, the system generates predictions (e.g., counterfactual explanations) that are in-sample.

18 Claims, 7 Drawing Sheets

(56)　　　　　References Cited

U.S. PATENT DOCUMENTS

2020/0184316　A1　　6/2020　Kavukcuoglu et al.
2020/0280573　A1　　9/2020　Johnson et al.
2021/0390974　A1*　12/2021　Kawaguchi ............. G10L 25/78

OTHER PUBLICATIONS

Qian, Sheng, et al. "Improving representation learning in autoencoders via multidimensional interpolation and dual regularizations." IJCAI (Year: 2019).*
Hamon, Ronan, Henrik Junklewitz, and Ignacio Sanchez. Robustness and explainability of artificial intelligence (Year: 2020).*
Wang, et al. "A parametric top-view representation of complex road scenes." (Year: 2019).*
Yang, et al., "Network intrusion detection based on supervised adversarial variational auto-encoder with regularization.", (Year: 2020).*
Seo, et al., "GIDS: GAN based intrusion detection system for in-vehicle network." (Year: 2018).*
Qian, et al. "Improving representation learning in autoencoders via multidimensional interpolation and dual regularizations." (Year: 2019).*
International Search Report and Written Opinion issued in corresponding International Application PCT/US2021/063089 on Apr. 15, 2022 (9 pages).
US Final Office Action on U.S. Appl. No. 17/138,886 Dated Sep. 18, 2024 (40 pages).
Yang, Yanqing, et al. "Network intrusion detection based on supervised adversarial variational auto-encoder with regularization." (Year: 2020) (16 pages).

* cited by examiner

<u>100</u>

400

Receive a first feature vector with an unknown alert status　402

Input the first feature vector into an artificial neural network　404

Receive a first prediction from the artificial neural network　406

Apply a gradient descent　408

Decode a higher-dimensional second feature vector　410

Generate a recommendation for a counterfactual explanation to a known alert status　412

<u>700</u>

METHODS AND SYSTEMS FOR GENERATING RECOMMENDATIONS FOR COUNTERFACTUAL EXPLANATIONS OF COMPUTER ALERTS THAT ARE AUTOMATICALLY DETECTED BY A MACHINE LEARNING ALGORITHM

FIELD OF THE INVENTION

The invention relates to generating recommendations for counterfactual explanations to computer alerts that are automatically detected by a machine learning algorithm.

BACKGROUND

In conventional systems, computer alerts are routinely generated based on automated processes. For example, in cyber security systems, the system may process numerous amounts and types of data to detect a cyber instance. In these systems, visibility into the underlying cause of such computer alerts is necessary, however. For example, the system needs to be able to generate an explanation of what triggered a given computer alert. Because of this, computer alert systems rely on systems that provide visibility into what triggered the computer alert.

SUMMARY

Methods and systems are described herein for generating counterfactual explanations to computer alerts that are automatically detected by a machine learning algorithm. For example, in many instances, visibility into an underlying cause is required in order to respond to a computer alert. Some machine learning algorithms (e.g., unsupervised deep learning algorithms) do not provide this visibility. However, these same machine learning algorithms may be the most powerful tool available for detecting computer alerts. To further complicate this problem, in many cases, the system is required to generate a human-readable explanation for a given computer alert (e.g., in order to rectify an issue that caused the alert). However, even if there was some visibility into which variable or variables caused the computer alert to be detected, outputting this data to a user does not provide information that may be intuitively understood. As described herein, the methods and systems generate a recommendation for counterfactual explanations to computer alerts.

A counterfactual explanation seeks to explain a prediction of a classification model by finding a minimal change to the model inputs that would cause the classifier to change its prediction. For example, with respect to a detected cyber incident, a counterfactual explanation defines the smallest change to one or more inputs (e.g., characteristics of the computer system and/or network activity) that would have prevented the computer alert from being detected. For example, the system may recommend what is the smallest change to the features (a specific email address from which an email was received) that would change the prediction from rejected to approved (e.g., an alert is detected if an email was received from this address, but is not necessarily triggered if an email was not received from that address). In many practical applications, describing what would have caused a given alert to not have been triggered is often the most intuitive way for a human user to understand an event based on numerous variables. That is, determining the smallest change one or more variables of the current computer status that would have resulted in an alert not being triggered, may provide the most useful information for assessing or resolving a computer issue.

However, one shortcoming of conventional approaches for generating counterfactuals is that the approaches do not constrain the changes to the input to produce counterfactual examples that are necessarily in-sample with respect to the data that the model was originally trained on. For example, the counterfactual might end up being an unrealistic anomaly (e.g., an alert that is detected based on an email address that does not exist). Such a counterfactual explanation is at best unhelpful, but at worst deceptive and may result in an erroneous assessment of the cause of a computer alert. This problem is particularly exacerbated for tabular data with categorical variables. For example, the most standard techniques for finding counterfactual explanations rely on a form of gradient descent on the input. However, when categorical features are present in the input, this can lead to counterfactual examples where the categorical variables are mixtures of multiple classes, which is clearly not representative of the original form of the data.

To overcome this problem, the methods and systems discussed herein introduced an artificial neural network architecture that trains a hybrid classifier and autoencoder. For example, one model (or artificial neural network), which is a classifier, is trained to make predictions. A second model (or artificial neural network), which is an autoencoder, is trained to reconstruct its inputs. As the second model is trained to reconstruct its inputs means, the second model is implicitly trained to determine what in-sample data looks like. By combining these networks and training them jointly, the system generates predictions (e.g., counterfactual explanations) that are in-sample.

For example, the system may use a shared encoder that transforms an input from a higher-dimensional feature space into a lower-dimensional latent encoding. After this, the artificial neural network branches into two models. A first model, a classifier, maps the latent encoding to a classification prediction. A second model, a decoder, maps the same latent representation back to the higher-dimensional feature space. Then to produce a counterfactual explanation to a new input, the system uses the encoder to find a latent encoding of that input. The system then performs a gradient descent on the latent encoding using a loss function that has a minimum at a specified classifier output. As the autoencoder has been trained to generate a latent representation that is specific to the training data set, the system may then decode a final latent encoding that results from the gradient descent to obtain an in-sample counterfactual explanation.

In one aspect, methods and systems for generating recommendations for counterfactual explanations to computer alerts that are automatically detected by a machine learning algorithm are described. For example, the system may receive a first feature vector with an unknown alert status, wherein the first feature vector represents values corresponding to a plurality of computer states in a first computer system. The system may input the first feature vector into an artificial neural network, wherein the artificial neural network is jointly trained to detect a known alert status based on labeled inputted feature vectors from a training data set corresponding to the known alert status and to generate, through adversarial training, dimensionally reduced representations of the labeled inputted feature vectors. The system may receive a first prediction from the artificial neural network, wherein the first prediction indicates whether a latent encoding of the first feature vector corresponds to the known alert status. The system may apply a gradient descent on the latent encoding using a loss function. The system may decode a higher-dimensional second feature vector, wherein the higher-dimensional second feature vector is a counterfactual explanation. The system may generate for display, on a user interface, a recommendation for the counterfactual explanation to the known alert status.

Another shortcoming of conventional approaches for generating counterfactuals is that it requires a system to perform a high dimensional optimization problem through a random search approach. Due to the processing requirements for such a request, recommendations based on a counterfactual cannot be generated in real-time or in near-real-time. Accordingly, the recommendations are ill-suited for use in response to user interface queries and/or recommendations appearing on a user interface, which need to generate responses that are both timely and pertinent (e.g., in a dynamic fashion).

In order to overcome this problem, the methods and systems discussed herein introduced an artificial neural network architecture that converts the regularized high dimensional optimization problem into an unconstrained low dimensional problem. For example, in conventional systems, determining a counterfactual explanation (e.g., a minimal change required to change a sample's classification) requires a gradient descent to a high dimensional problem and/or a constrained optimization in the original high dimensional input space space (e.g., 784 variables). The present methods and systems allow for linear interpolation to be applied in the latent space. For example, the system performs unconstrained optimization in the latent space as a function of a single variable. The result is a lower computational cost compared to gradient descent in the original high dimensional input space space. Accordingly, the system may generate recommendations on counterfactual explanations in real-time or in near-real-time.

In one aspect, methods and systems for generating recommendations for counterfactual explanations to computer alerts that are automatically detected by machine learning algorithms are described. For example, the system may receive a first feature vector with an unknown alert status, wherein the first feature vector represents values corresponding to a plurality of computer states in a first computer system. The system may input the first feature vector into an artificial neural network, wherein the artificial neural network comprises a classifier used to detect a class of a known alert status based on labeled inputted feature vectors from a training data set corresponding to the class of the known alert status, a first autoencoder trained on the class of the known alert status, and a second autoencoder trained on multiple classes of known alert statuses, wherein the multiple classes includes the class of the known alert status and an additional class of known alert statuses. The system may receive a first prediction from the classifier of the artificial neural network, wherein the first prediction indicates whether the unknown alert status corresponds to the class of the known alert status. The system may receive a first output from the first autoencoder of the artificial neural network and second output from the second autoencoder of the artificial neural network. The system may generate for display, on a user interface, a recommendation for a counterfactual explanation to the first prediction based on the first output and the second output.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form to avoid unnecessarily obscuring the embodiments of the invention.

Figure 1:
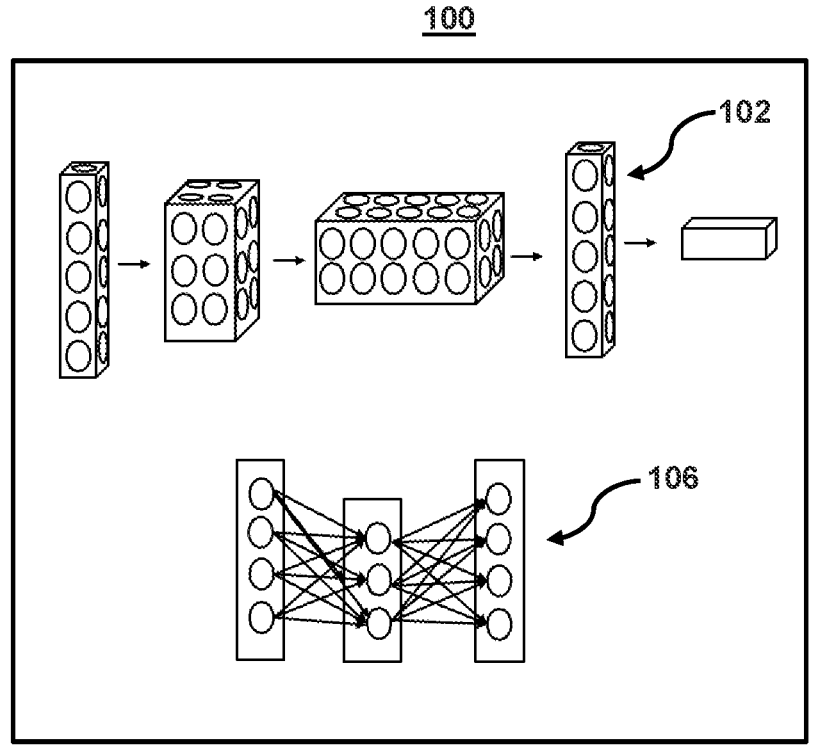
FIG. 1 shows a diagram for generating recommendations for counterfactual explanations to computer alerts that are automatically detected by a machine learning algorithm, in accordance with one or more embodiments.
Figure 1:
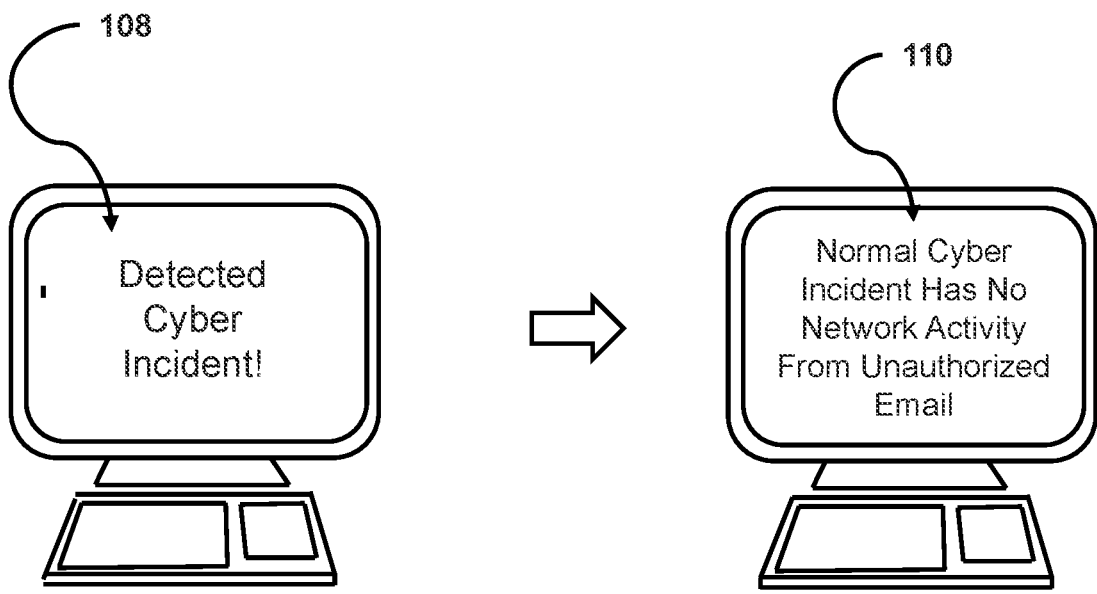

FIG. 1 shows a diagram for generating recommendations for counterfactual explanations to computer alerts that are automatically detected by a machine learning algorithm, in accordance with one or more embodiments. For example, a counterfactual explanation seeks to explain a prediction of a classification model by finding a minimal change to the model inputs that would cause the classifier to change its prediction. For example, with respect to a detected cyber incident, a counterfactual explanation defines the smallest change to one or more inputs (e.g., characteristics of the computer system and/or network activity) that would have prevented the computer alert from being detected. For example, the system may recommend what is the smallest change to the features (a specific email address from which an email was received) that would change the prediction from rejected to approved (e.g., an alert is detected is an email was received from this address, but is not necessarily triggered if an email was not received from that address). In many practical applications describing what would have caused a given alert to not have been triggered is often the most intuitive way for a human user to understand an event based on numerous variables.

As shown in FIG. 1, the system trains artificial neural network 100 as a hybrid classifier and autoencoder. For example, one model (e.g., artificial neural network 104), which is a classifier, is trained to make predictions such as to whether or not a cyber incident is detected. A second model (e.g., artificial neural network 106), which is an autoencoder, is trained to reconstruct its inputs. For example, the inputs may be a first feature vector that represents values corresponding to a plurality of computer states in a first computer system. As the second model (e.g., artificial neural network 106) is trained to reconstruct its inputs means, the second model is implicitly trained to determine what in-sample data looks like (e.g., generate an output feature vector that is in-sample). By combining artificial neural network 104 and artificial neural network 106 and training them jointly, the system generates predictions (e.g., counterfactual explanations) that are in-sample. For example, artificial neural network 100 may generate a recommendation of a detected cyber incident (recommendation 108) and/or a recommendation featuring a counterfactual explanation (recommendation 110).

For example, the system (e.g., artificial neural network 100) may use a shared encoder that transforms an input (e.g., a first feature vector that represents values corresponding to a plurality of computer states in a first computer system) from a higher-dimensional feature space into a lower-dimensional latent encoding. Artificial neural network 100 then branches into two models (e.g., artificial neural network 104 and artificial neural network 106). A first model (e.g., artificial neural network 104), a classifier, maps the latent encoding to a classification prediction (e.g., a detected cyber incident). A second model (e.g., artificial neural network 106), a decoder, maps the same latent representation back to the higher-dimensional feature space. Then to produce a counterfactual explanation to a new input, the artificial neural network 100 uses the encoder to find a latent encoding of that input. Artificial neural network 100 then performs a gradient descent on the latent encoding using a loss function that has a minimum at a specified classifier output. As artificial neural network 106 has been trained to generate a latent representation that is specific to the training data set, artificial neural network 100 may then decode a final latent encoding that results from the gradient descent to obtain an in-sample counterfactual explanation (e.g., recommendation 110).

Notably, for tabular data, where the categorical features are one-hot encoded, the autoencoder (artificial neural network 106) may learn a sparse representation in the latent space and so gradient descent in the latent space may still produce out-of-sample counterfactuals. To prevent this, artificial neural network 100 trains the autoencoder portion of the model (e.g., artificial neural network 106) in an adversarial manner so that the latent representation of training data is forced to match an isotropic gaussian distribution, making the latent representation compact as well, so any decoded encoding should be in-sample with respect to the training data.

Figure 2:
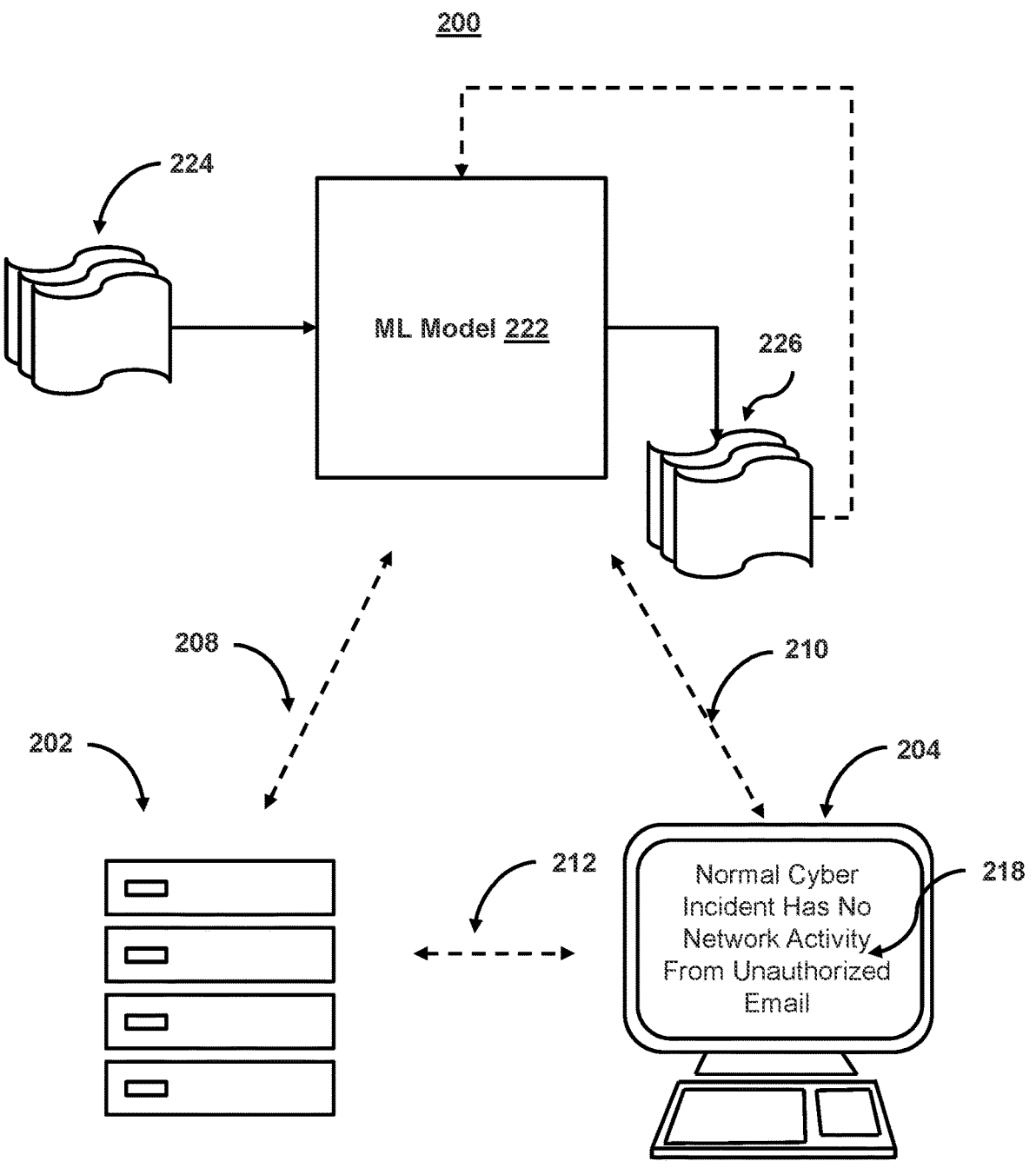
FIG. 2 shows a system featuring a machine learning model configured to generate recommendations for counterfactual explanations to computer alerts that are automatically detected by a machine learning algorithm, in accordance with one or more embodiments.

FIG. 2 shows a system featuring a machine learning model configured to generate recommendations for counterfactual explanations to computer alerts that are automatically detected by a machine learning algorithm, in accordance with one or more embodiments. As shown in FIG. 2, system 200 may include client device 202, client device 204 or other components. Each of client devices 202 and 204 may include any type of mobile terminal, fixed terminal, or other device. Each of these devices may receive content and data via input/output (hereinafter "I/O") paths and may also include processors and/or control circuitry to send and receive commands, requests, and other suitable data using the I/O paths. The control circuitry may comprise any suitable processing circuitry. Each of these devices may also include a user input interface and/or display for use in receiving and displaying data. By way of example, client devices 202 and 204 may include a desktop computer, a server, or other client device. Users may, for instance, utilize one or more client devices 202 and 204 to interact with one another, one or more servers, or other components of system 200. It should be noted that, while one or more operations are described herein as being performed by particular components of system 200, those operations may, in some embodiments, be performed by other components of system 200. As an example, while one or more operations are described herein as being performed by components of client device 202, those operations may, in some embodiments, be performed by components of client device 204. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

Each of these devices may also include memory in the form of electronic storage. The electronic storage may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 2 also includes communication paths 208, 210, and 212. Communication paths 208, 210, and 212 may include the Internet, a mobile phone network, a mobile voice or data network (e.g., a 4G or LTE network), a cable network, a public switched telephone network, or other types of communications network or combinations of communications networks. Communication paths 208, 210, and 212 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

In some embodiments, system 200 may use one or more prediction models to generate recommendations for counterfactual explanations to computer alerts that are automatically detected by a machine learning algorithm. For example, as shown in FIG. 2, system 200 may detect a computer status alert (e.g., alert 104 (FIG. 1)) using machine learning model 222. The determination may be output shown as output 218 on client device 204. The system may include one or more neural networks (e.g., as discussed in relation to FIG. 3) or other machine learning models. System 200 may also provide a recommendation for the cause of the computer status alert (e.g., recommendation 110 (FIG. 1)) using machine learning model 222. The recommendation may be output shown as output 218 on client device 204.

As an example, with respect to FIG. 2, machine learning model 222 may take inputs 224 and provide outputs 226. The inputs may include multiple data sets such as a training data set and a test data set. For example, in some embodiments, the known alert status may comprise a detected fraudulent transaction, and the values corresponding to the plurality of computer states in the first computer system may indicate a transaction history of a user. The test data may comprise data on transaction histories labeled with a known fraudulent transaction. In some embodiments, the known alert status comprises a detected cyber incident, and the values corresponding to the plurality of computer states in the first computer system may indicate networking activity of a user. The test data may comprise data on networking activity labeled with known cyber incidents. In some embodiments, the known alert status may comprise a refusal of a credit application, and the values corresponding to the plurality of computer states in the first computer system may indicate credit history of a user. The test data may comprise data on credit histories labeled with a known refusals of credit applications. In some embodiments, the known alert status may comprise a detected identity theft, and the values corresponding to the plurality of computer states in the first computer system may indicate a user transaction history. The test data may comprise data on transaction histories labeled with a known instances of identity theft.

In one use case, outputs 226 may be fed back to machine learning model 222 as input to train machine learning model 222 (e.g., alone or in conjunction with user indications of the accuracy of outputs 226, labels associated with the inputs, or with other reference feedback information). In another use case, machine learning model 222 may update its configurations (e.g., weights, biases, or other parameters) based on its assessment of its prediction (e.g., outputs 226) and reference feedback information (e.g., user indication of accuracy, reference labels, or other information). In another use case, where machine learning model 222 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 222 may be trained to generate better predictions.

Machine learning model 222 may be trained to detect a known alert status based on a set of training data comprising labeled feature vectors corresponding to the known alert status, and wherein the artificial neural network is trained to detect conditional expectations the plurality of computer states in an inputted feature vector. For example, machine learning model 222 may have classifications for the known computer status alerts.

Figure 3:
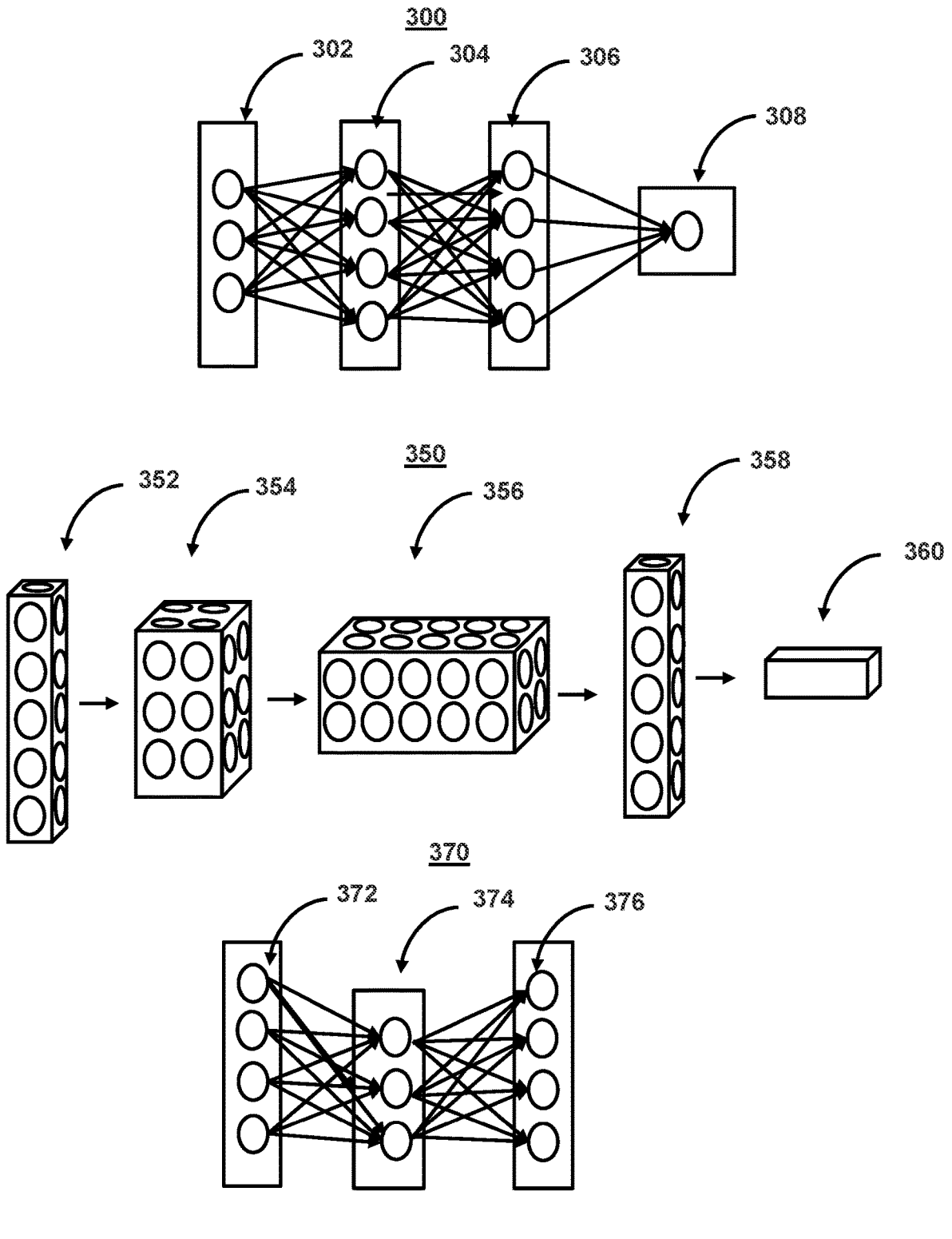
FIG. 3 shows graphical representations of artificial neural network models for generating recommendations for counterfactual explanations to computer alerts that are automatically detected by a machine learning algorithm, in accordance with one or more embodiments.

FIG. 3 shows graphical representations of artificial neural network models for generating recommendations for counterfactual explanations to computer alerts that are automatically detected by a machine learning algorithm, in accordance with one or more embodiments. Model 300 illustrates an artificial neural network. Model 300 includes input layer 302. Model 300 also includes one or more hidden layers (e.g., hidden layer 304 and hidden layer 306). Model 300 may be based on a large collection of neural units (or artificial neurons). Model 300 loosely mimics the manner in which a biological brain works (e.g., via large clusters of biological neurons connected by axons). Each neural unit of a model 300 may be connected with many other neural units of model 300. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function such that the signal must surpass before it propagates to other neural units. Model 300 may be self-learning and trained, rather than explicitly programmed, and can perform significantly better in certain areas of problem solving, as compared to traditional computer programs. During training, output layer 308 may corresponds to a classification of model 300 (e.g., whether or not an alert status corresponds to a given values corresponding to the plurality of computer states) and an input known to correspond to that classification may be input into input layer 302. In some embodiments, model 300 may include multiple layers (e.g., where a signal path traverses from front layers to back layers). In some embodiments, back propagation techniques may be utilized by model 300 where forward stimulation is used to reset weights on the "front" neural units. In some embodiments, stimulation and inhibition for model 300 may be more free-flowing, with connections interacting in a more chaotic and complex fashion. Model 300 also includes output layer 308. During testing, output layer 308 may indicate whether or not a given input corresponds to a classification of model 300 (e.g., whether or not an alert status corresponds to a given values corresponding to the plurality of computer states).

FIG. 3 also includes model 350, which is a convolutional neural network. The convolutional neural network is an artificial neural network that features one or more convolutional layers. As shown in model 350, input layer 352 may proceed to convolution blocks 354 and 356 before being output to convolutional block 358. In some embodiments, model 350 may itself serve as an input to model 300. Model 350 may generate output 360, which may include data used to generate a recommendation (e.g., recommendation 110 (FIG. 1)).

In some embodiments, model 350 may implement an inverted residual structure where the input and output of a residual block (e.g., block 354) are thin bottleneck layers. A residual layer may feed into the next layer and directly into layers that are one or more layers downstream. A bottleneck layer (e.g., block 358) is a layer that contains few neural units compared to the previous layers. Model 350 may use a bottleneck layer to obtain a representation of the input with reduced dimensionality. An example of this is the use of autoencoders with bottleneck layers for nonlinear dimensionality reduction. Additionally, model 350 may remove non-linearities in a narrow layer (e.g., block 358) in order to maintain representational power. In some embodiments, the design of model 350 may also be guided by the metric of computation complexity (e.g., the number of floating point operations). In some embodiments, model 350 may increase the feature map dimensions at all units to involve as many locations as possible instead of sharply increasing the feature map dimensions at neural units that perform downsampling. In some embodiments, model 350 may decrease the depth and increase width of residual layers in the downstream direction.

FIG. 3 also includes model 370, which is an autoencoder. An autoencoder is a neural network that learns to copy its input (e.g., input layer 372) to its output (e.g., output layer 376). The artificial neural network also has an internal (hidden) layer (e.g., layer 374) that describes a code used to represent the input, and it is constituted by two main parts: an encoder that maps the input into the code, and a decoder that maps the code to a reconstruction of the original input, a convolutional neural network.

For example, the system may receive a first prediction from model 370, wherein the first prediction indicates whether a latent encoding of the first feature vector (e.g., input from input layer 372) corresponds to a known alert status. Model 370 may then apply a gradient descent. For example, the system may apply a gradient descent on the latent encoding using a loss function. In some embodiments, the latent encoding of the first feature vector has an isotropic gaussian distribution. Model 370 may then decode the latent encoding back into a higher-dimensional second feature vector (e.g., at output layer 376). For example, the system may decode a higher-dimensional second feature vector, wherein the higher-dimensional second feature vector is a counterfactual explanation. For example, in many applications there will be no linear boundary separating the classes, and the problem of searching for an optimal separating hyperplane is meaningless. Transforming the data to a higher-dimensional feature space in which classes are linearly separable may lead to an over-fitting of the data, and hence poor generalization ability. For example, if the system transforms to a high dimensional feature space and is trained from there, the artificial neural network is "forced" to take into account the higher-space features, even though they might have nothing to do with the original data, and offer no predictive qualities. Thus, by first determining the latent encoding, and then decoding the higher-dimensional second feature vector, this issue is avoided.

Figure 4:
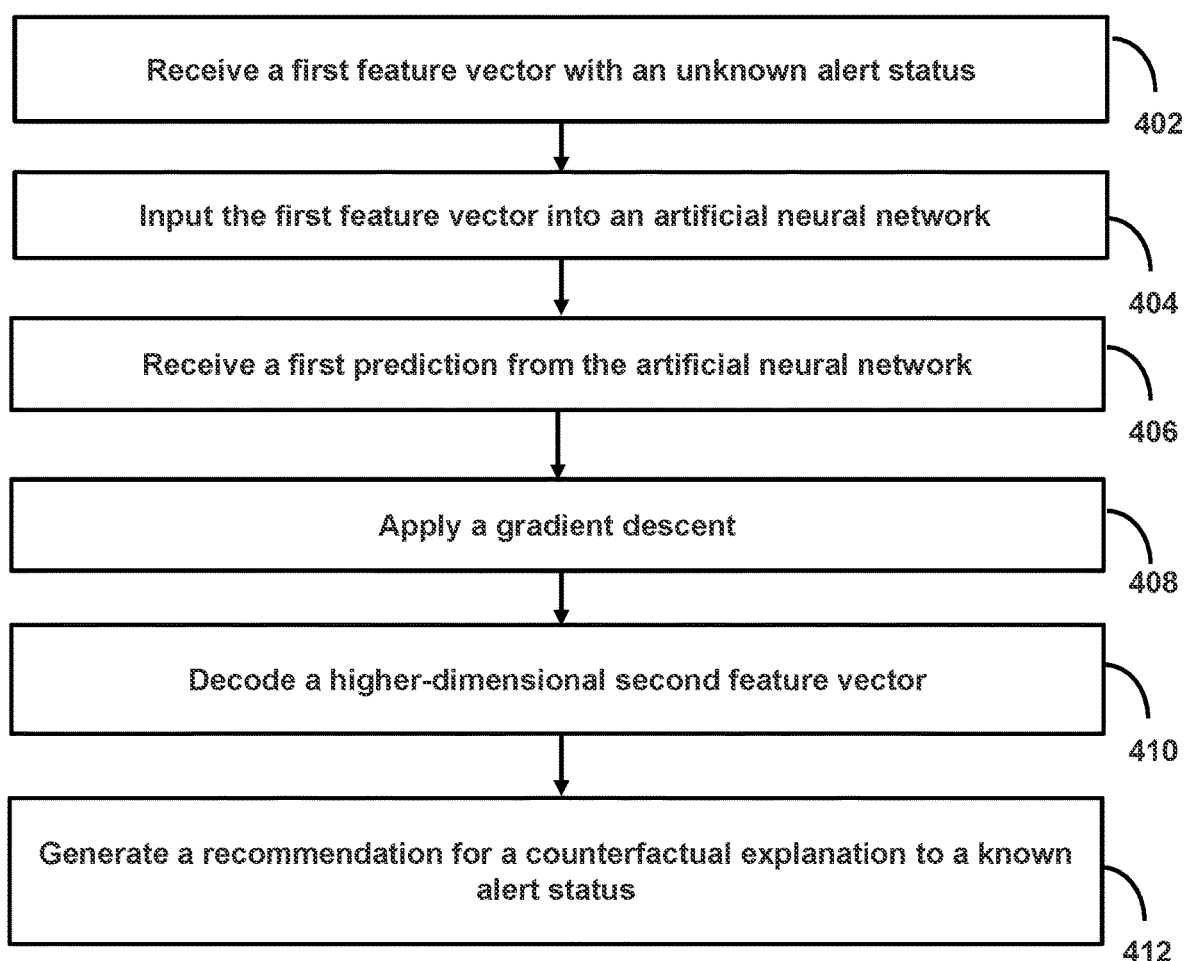
FIG. 4 shows a flowchart for generating recommendations for counterfactual explanations to computer alerts that are automatically detected by a machine learning algorithm, in accordance with one or more embodiments.

FIG. 4 shows a flowchart for generating recommendations for counterfactual explanations to computer alerts that are automatically detected by a machine learning algorithm, in accordance with one or more embodiments. For example, process 400 may represent the steps taken by one or more devices as shown in FIGS. 1-3 for recommendations for counterfactual explanations to computer alerts that are automatically detected by a machine learning algorithm. For example, the counterfactual explanation may describe a causal situation in the form: "If X had not occurred, Y would not have occurred". In many instances, the counterfactual explanation allows for the system to provide a hypothetical example that contradicts the observed facts, which may be helpful in providing a recommendation.

At step 402, process 400 receives (e.g., using one or more components of system 200 (FIG. 2)) a first feature vector with an unknown alert status. For example, the system may receive a first feature vector with an unknown alert status, wherein the first feature vector represents values corresponding to a plurality of computer states in a first computer system. In some embodiments, the first feature vector may be tabular data with categorical variables. For example, the data may be structured into rows, each of which contains information about a categorical variable. Each row may contain the same number of cells (although some of these cells may be empty), which may provide values for the categories described by the row. For example, tabular data is inherently rectangular and cannot have "ragged rows". If any row is lacking information for a particular column, a missing value must be stored in that cell. Storing data this way allows the system to easily extract data for use in time series and correlation plots by pulling out selected columns (e.g., as opposed to data in a relational data structure).

At step 404, process 400 inputs (e.g., using one or more components of system 200 (FIG. 2)) the first feature vector into an artificial neural network. For example, the system may input the first feature vector into an artificial neural network, wherein the artificial neural network is jointly trained to detect a known alert status based on labeled inputted feature vectors from a training data set corresponding to the known alert status and to generate, through adversarial training, dimensionally reduced representations of the labeled inputted feature vectors.

For example, the artificial neural network may include an autoencoder, which learns efficient data coding in an unsupervised manner. The artificial neural network learns a representation (encoding) for the set of data by training the artificial neural network to ignore signal "noise" (e.g., to reduce the dimensionality of the higher dimensional feature vector). Additionally or alternatively, the system trains the artificial neural network in an adversarial manner, in which the training involves attempts to contradict the models by supplying deceptive inputs. For example, by using adversarial training, the system creates robust optimization by incorporating adversarial examples into the training process.

At step 406, process 400 receives (e.g., using one or more components of system 200 (FIG. 2)) a first prediction from the artificial neural network. For example, the system may receive a first prediction from the artificial neural network wherein the first prediction indicates whether a latent encoding of the first feature vector corresponds to the known alert status At step 408, process 400 applies (e.g., using one or more components of system 200 (FIG. 2)) a gradient descent. For example, the system may apply a gradient descent (e.g., processing an input through a series of small changes that gradually push it toward new values that cause the classifier to change its prediction away from the original class) on the latent encoding using a loss function. In some embodiments, the latent encoding of the first feature vector has an isotropic gaussian distribution. For example, an isotropic distribution is a special type of multidimensional distribution which possesses some of the properties of the spherical multivariate normal distribution. These distributions, often called spherically symmetric distributions, are characterized by their invariance under orthogonal transformation. A Gaussian distribution, also known as the normal distribution, is a probability distribution that is symmetric about the mean, showing that data near the mean are more frequent in occurrence than data far from the mean. In graph form, normal distribution will appear as a bell curve. Gaussian distributions are particularly beneficial because they fit many natural phenomena. In some embodiments, the loss function has a minimum at a decision boundary between two classes of the artificial neural network. For example, the loss function may be a function that maps an event or values of one or more variables onto a real number intuitively representing some "cost" associated with an event. The system may minimize the loss function to minimize the cost.

At step 410, process 400 decodes (e.g., using one or more components of system 200 (FIG. 2)) a higher-dimensional second feature vector. For example, the system may decode a higher-dimensional second feature vector wherein the higher-dimensional second feature vector is a counterfactual explanation. For example, in many applications there will be no linear boundary separating the classes, and the problem of searching for an optimal separating hyperplane is meaningless. Transforming the data to a higher-dimensional feature space in which classes are linearly separable may lead to an over-fitting of the data, and hence poor generalization ability. For example, if the system transforms to a higher dimensional feature space and is trained from there, the artificial neural network is "forced" to take into account the higher-space features, even though they might have nothing to do with the original data, and offer no predictive qualities. Thus, by first determining the latent encoding, and then decoding the higher-dimensional second feature vector, this issue is avoided.

At step 412, process 400 generates (e.g., using one or more components of system 200 (FIG. 2)) a recommendation for the counterfactual explanation to the known alert status. For example, the system may generate for display, on a user interface, a recommendation for the counterfactual explanation to the known alert status. In some embodiments, the counterfactual explanation to the known alert status may indicate a minimal change to the first feature vector that would cause the artificial neural network to change the first prediction.

For example, the counterfactual explanation may be a prediction that describes the smallest change to the feature values that changes the prediction to a predefined output. In one example, a user may apply for a loan. The information about the user (e.g., credit history) may be represented as a feature input into an artificial neural network. If the user's loan is rejected by the artificial neural network, the user may question why. The system may provide a recommendation that includes a counterfactual explanation (e.g., why his/her application was rejected, how he/she might improve a chance at acceptance, etc.). For example, the system may determine and answer to the question of "why". For example, the system may recommend what is the smallest change to the features (income, number of credit cards, age, etc.) that would change the prediction from rejected to approved.

Due to the artificial neural network being jointly trained to detect a known alert status based on labeled inputted feature vectors from a training data set corresponding to the known alert status, and to generate, through adversarial training, dimensionally reduced representations of the labeled inputted feature vectors, the counterfactual explanation comprises values within the training data set. That is, the counterfactual explanation includes values that are "real". In the hypothetical above, the counterfactual explanation provided to the user may include values in the counterfactual that are "real" (e.g., exist in the training data). Accordingly, a recommendation provided by the system will be coherent when provided to a user (e.g., the system will not suggest the user should have a credit score that is impossible).

During joint training, multiple sub-tasks are all trained together. For example, in the artificial neural network, multiple different layers may each have a different role (e.g., classifier, encoder, etc.). For example, the model may be an aggregate of models, which learn everything together (jointly), or separately. The model may alternatively or additionally have a multitask mode where the models learn to do multiple things at once (e.g. multiple outputs). In some embodiments, the system may use model averaging, which is an ensemble technique where multiple sub-models contribute equally to a combined prediction. The system may improve the model averaging by weighting the contributions of each sub-model to the combined prediction by the expected performance of the sub-model. This can be extended further by training an entirely new model to learn how to best combine the contributions from each sub-model (e.g., using stacked generalization).

The system may provide a recommendation that includes a counterfactual explanation (e.g., why his/her application was rejected, how he/she might improve a chance at acceptance, etc.). For example, the system may determine and answer to the question of "why". For example, the system may recommend what is the smallest change to the features (income, number of credit cards, age, etc.) that would change the prediction from rejected to approved. For example, in embodiments where the known alert status comprises a detected fraudulent transaction, and the system may identify the occurrence of the known alert status as well as indicating which value (e.g., a given transaction and/or characteristic thereof) triggered the alert. In embodiments where the known alert status comprises a detected cyber incident, and the system may identify the occurrence of the known alert status as well as indicating which value (e.g., an instance of network activity and/or characteristic thereof) triggered the alert. In embodiments where the known alert status comprises a refusal of a credit application, and the system may identify the occurrence of the known alert status, as well as indicating which value (e.g., a given applicant or account value, user history category, regulation criteria, and/or characteristic thereof) triggered the alert. In embodiments where the known alert status comprises a detected identity theft, and the system may identify the occurrence of the known alert status as well as indicating which value (e.g., a transaction and/or characteristic thereof) triggered the alert.

It is contemplated that the steps or descriptions of FIG. 4 may be used with any other embodiment of this disclosure. In addition, the steps and descriptions described in relation to FIG. 4 may be done in alternative orders, or in parallel to further the purposes of this disclosure. For example, each of these steps may be performed in any order, or in parallel, or substantially simultaneously to reduce lag or increase the speed of the system or method. Furthermore, it should be noted that any of the devices or equipment discussed in relation to FIGS. 1-3 could be used to perform one or more of the steps in FIG. 4.

Figure 5:
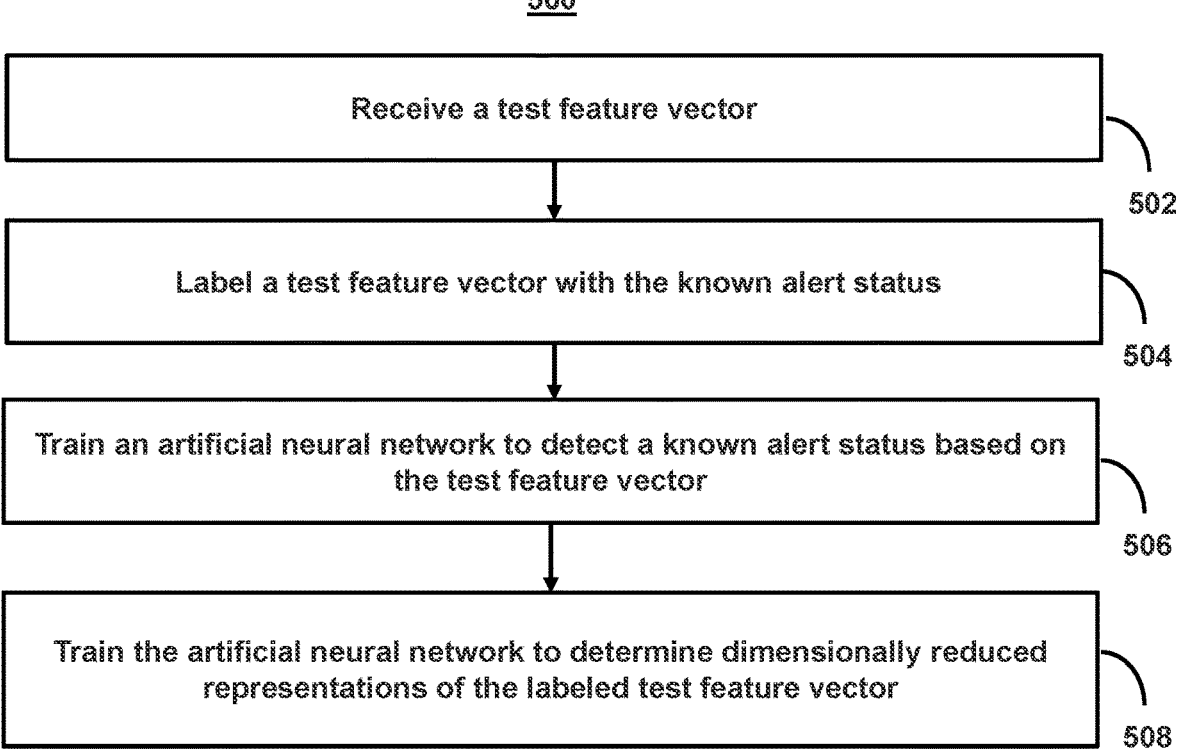
FIG. 5 shows a flowchart for training an artificial neural network to generate recommendations for counterfactual explanations to computer alerts that are automatically detected by a machine learning algorithm, in accordance with one or more embodiments.

FIG. 5 shows a flowchart for training an artificial neural network to generate recommendations for counterfactual explanations to computer alerts that are automatically detected by a machine learning algorithm, in accordance with one or more embodiments. For example, process 500 may represent the steps taken by one or more devices as shown in FIGS. 1-3 for generating recommendations for counterfactual explanations to computer alerts that are automatically detected by a machine learning algorithm.

At step 502, process 500 receives (e.g., using one or more components of system 200 (FIG. 2)) a test feature vector. For example, the system may receive a test feature vector, wherein the test feature vector represents test values corresponding to computer states that correspond to the known alert status. For example, the system may receive a plurality of computer states in a first computer system. The system may then generate a first feature vector based on the plurality of computer states in the first computer system. The system may then label the first feature vector with a known alert status.

At step 504, process 500 labels (e.g., using one or more components of system 200 (FIG. 2)) a test feature vector with the known alert status. For example, the system may label the test feature vector with the known alert status. For example, the first feature vector may be tabular data with categorical variables and the value in each category may represent the plurality of computer states.

At step 506, process 500 trains (e.g., using one or more components of system 200 (FIG. 2)) an artificial neural network to detect a known alert status based on the test feature vector. For example, the system may train the artificial neural network to detect the known alert status based on the test feature vector.

At step 508, process 500 trains (e.g., using one or more components of system 200 (FIG. 2)) the artificial neural network to determine dimensionally reduced representations of the labeled test feature vector. For example, the system may train the artificial neural network to generate, through adversarial training, dimensionally reduced representations of the labeled inputted feature vectors.

It is contemplated that the steps or descriptions of FIG. 5 may be used with any other embodiment of this disclosure. In addition, the steps and descriptions described in relation to FIG. 5 may be done in alternative orders, or in parallel to further the purposes of this disclosure. For example, each of these steps may be performed in any order, or in parallel, or substantially simultaneously to reduce lag or increase the speed of the system or method. Furthermore, it should be noted that any of the devices or equipment discussed in relation to FIGS. 1-3 could be used to perform one or more of the steps in FIG. 5.

Figure 6:
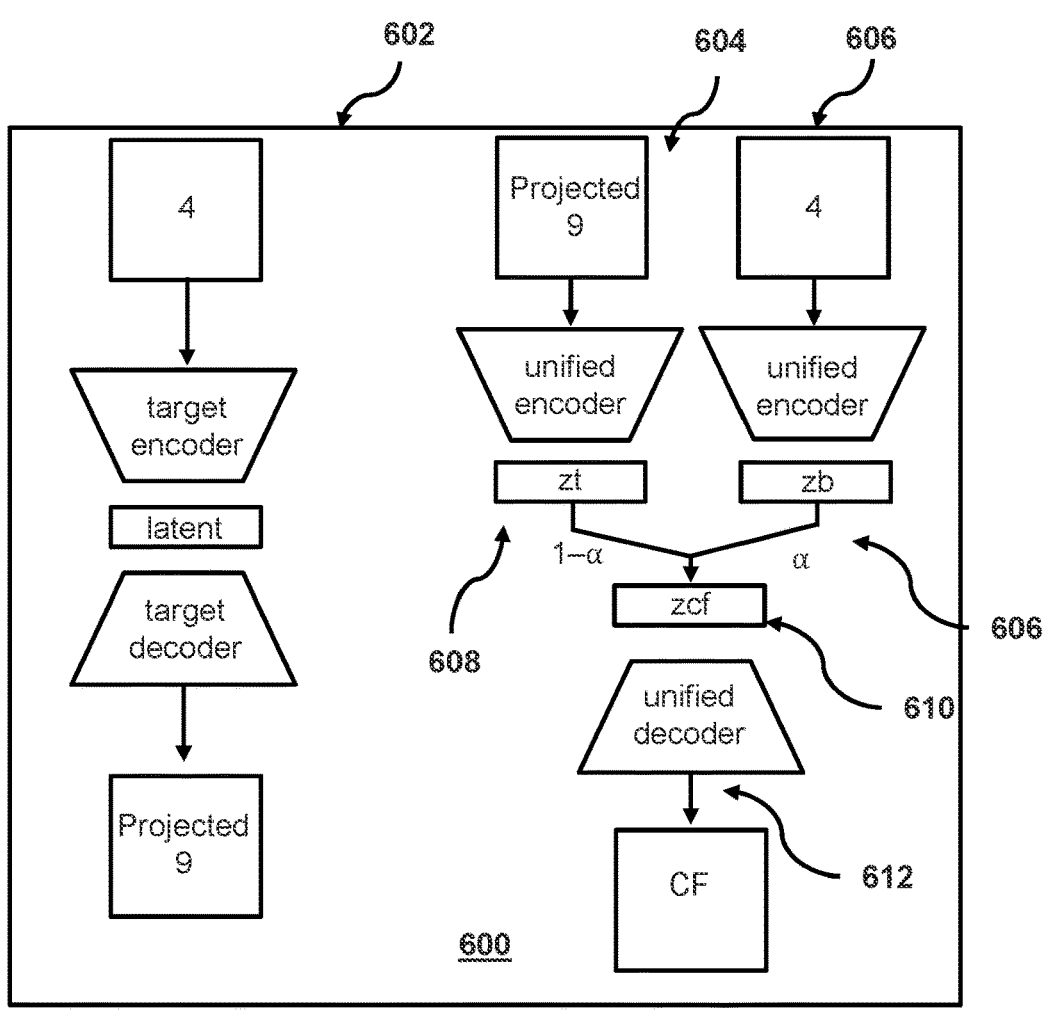
FIG. 6 shows a diagram for generating recommendations for counterfactual explanations to computer alerts that are automatically detected by machine learning algorithms, in accordance with one or more embodiments.
Figure 6:
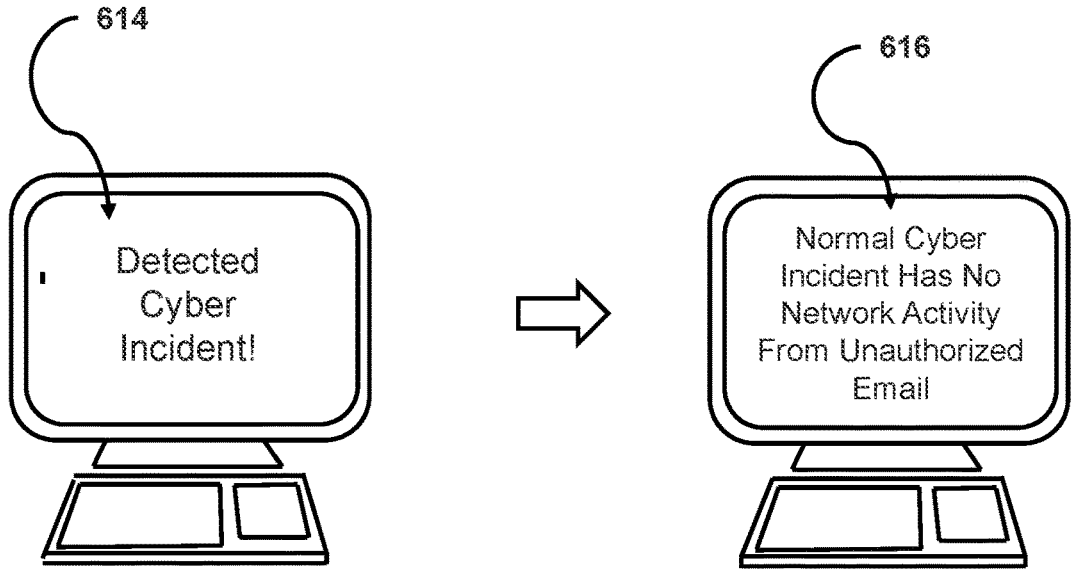

FIG. 6 shows a diagram for generating recommendations for counterfactual explanations to computer alerts that are automatically detected by machine learning algorithms, in accordance with one or more embodiments. For example, a counterfactual explanation seeks to explain a prediction of a classification model by finding a minimal change to the model inputs that would cause the classifier to change its prediction. For example, with respect to a detected cyber incident, a counterfactual explanation defines the smallest change to one or more inputs (e.g., characteristics of the computer system and/or network activity) that would have prevented the computer alert from being detected. For example, the system may recommend what is the smallest change to the features (a specific email address from which an email was received) that would change the prediction from rejected to approved (e.g., an alert is detected is an email was received from this address, but is not necessarily triggered if an email was not received from that address). In many practical applications describing what would have caused a given alert to not have been triggered is often the most intuitive way for a human user to understand an event based on numerous variables.

System 600 represents the architecture for a machine learning model configured to generate recommendations for counterfactual explanations to computer alerts that are automatically detected by machine learning algorithms. For example, system 600 may be used to generate a recommendation of a detected cyber incident (recommendation 614) and/or a recommendation featuring a counterfactual explanation (recommendation 616). For example, system 600 includes first model (e.g., model 602) and a second model (e.g., model 604). For example, system 600 may comprise a artificial neural network that comprise first model 602 that includes a classifier used to detect a class of a known alert status based on labeled inputted feature vectors from a training data set corresponding to the class of the known alert status. Second model 604 may include a first autoencoder (e.g., autoencoder 608) trained on the class of the known alert status, and a second autoencoder (e.g., autoencoder 610) trained on multiple classes of known alert statuses, wherein the multiple classes includes the class of the known alert status and an additional class of known alert statuses.

For example, as an illustrative example, system 600 may comprise a classifier that is trained to classify an input into a first class (e.g., corresponding to the numeral "4") and a second class (e.g., corresponding to the numeral "9"). The classifier may comprise an artificial neural network (e.g., as described in FIG. 3 above). The classier may also be used by model 602 as an encoder. For example, model 602 may use an agnostic classifier model. Outputs from model 602 may be input into model 604. Second model 604 may include a first autoencoder (e.g., autoencoder 608) trained on a single class (e.g., corresponding to the numeral "9") and a second autoencoder (e.g., autoencoder 610) trained on multiple classes (e.g., corresponding to the numerals "4" and "9"). In some embodiments, the first autoencoder (e.g., autoencoder 608) and the second autoencoder (e.g., autoencoder 610) may have the same architecture on different training sets. For example, the first autoencoder (e.g., autoencoder 608) may include a target encoder that generates a latent space of an input and a target decoder. Similarly, the second autoencoder (e.g., autoencoder 610) may include a unified encoder that generates a latent space of an input and a unified decoder.

In some embodiments, an output of the first autoencoder (e.g., autoencoder 608) and an output of the second autoencoder (e.g., autoencoder 610) are used to generate through linear interpolation in the latent space at point 606. The result of the linear interpolation may then be used as an input to a unified decoder. The system may then use a gradient descent to determine a distance to a decision boundary of two classes and a loss function for a distance to a desired probability. The system then uses the result of the loss function to generate a counterfactual explanation at point 612.

Figure 7:
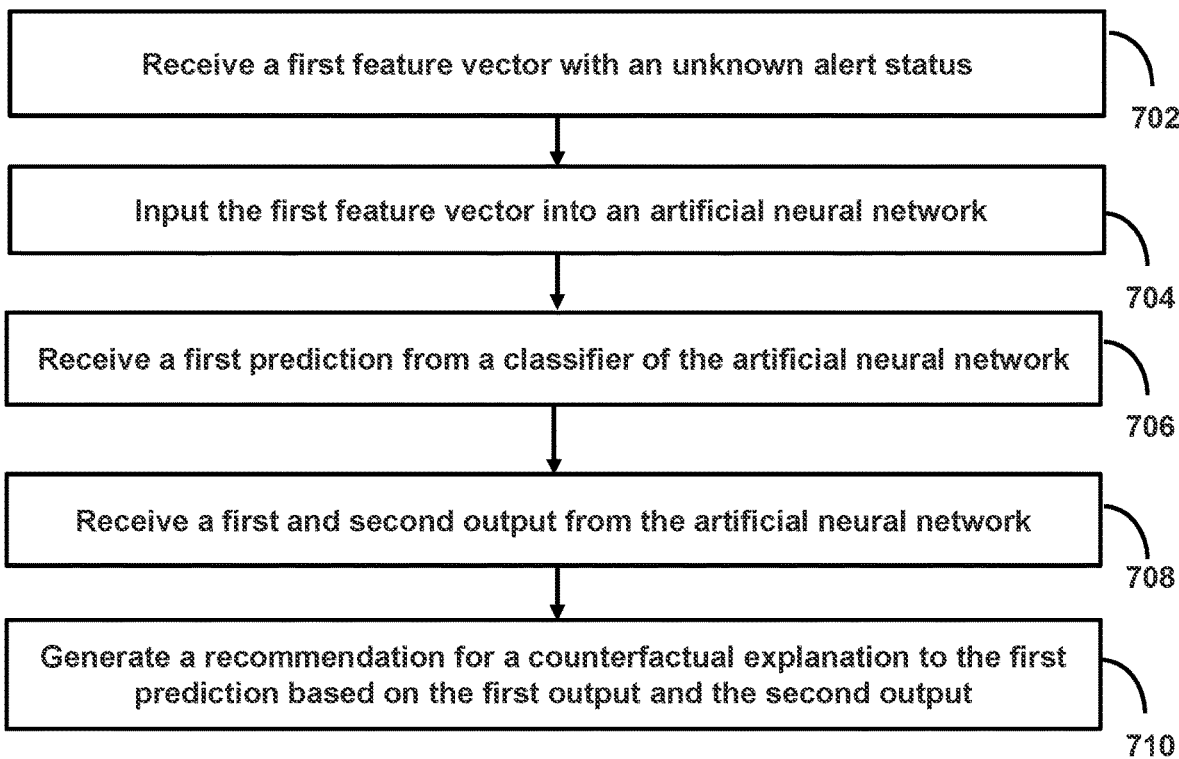
FIG. 7 shows a flowchart for generating recommendations for counterfactual explanations to computer alerts that are automatically detected by machine learning algorithms, in accordance with one or more embodiments.

FIG. 7 shows a flowchart for generating recommendations for counterfactual explanations to computer alerts that are automatically detected by machine learning algorithms, in accordance with one or more embodiments. For example, process 700 may represent the steps taken by one or more devices as shown in FIGS. 1-3 and 6 for recommendations for counterfactual explanations to computer alerts that are automatically detected by a machine learning algorithm. For example, the counterfactual explanation may describe a causal situation in the form: "If X had not occurred, Y would not have occurred." In many instances, the counterfactual explanation allows for the system to provide a hypothetical example that contradicts the observed facts, which may be helpful in providing a recommendation.

At step 702, process 700 receives (e.g., using one or more components of system 200 (FIG. 2)) a first feature vector with an unknown alert status. For example, the system may receive, using control circuitry, a first feature vector with an unknown alert status, wherein the first feature vector represents values corresponding to a plurality of computer states in a first computer system.

At step 704, process 700 inputs (e.g., using one or more components of system 200 (FIG. 2)) the first feature vector into an artificial neural network. For example, the system may input, using the control circuitry, the first feature vector into an artificial neural network, wherein the artificial neural network comprises a classifier used to detect a class of a known alert status based on labeled inputted feature vectors from a training data set corresponding to the class of the known alert status, a first autoencoder trained on the class of the known alert status, and a second autoencoder trained on multiple classes of known alert statuses, wherein the multiple classes includes the class of the known alert status and an additional class of known alert statuses.

At step 706, process 700 receives (e.g., using one or more components of system 200 (FIG. 2)) a first prediction from a classifier of the artificial neural network. For example, the system may receive, using the control circuitry, a first prediction from the classifier of the artificial neural network, wherein the first prediction indicates whether the unknown alert status corresponds to the class of the known alert status.

At step 708, process 700 receives (e.g., using one or more components of system 200 (FIG. 2)) a first and second output from the artificial neural network. For example, the system may receive, using the control circuitry, a first output from the first autoencoder of the artificial neural network and second output from the second autoencoder of the artificial neural network. In some embodiments, the system may apply linear interpolation to the first output and the second output to generate a decoder input. The system may then input the decoder input into a unified decoder, wherein the unified decoder is trained on the multiple classes of the known alert statuses and receive an output from the unified decoder. The system may apply a gradient descent loss function for a probability that the known alert status corresponds to the class of the known alert status to the output from the unified decoder and generate the recommendation based on the probability. For example, the gradient descent loss function has a minimum at a decision boundary between the class of the known alert status and the additional class of the known alert statuses.

At step 710, process 700 generates (e.g., using one or more components of system 200 (FIG. 2)) a recommendation for a counterfactual explanation to the first prediction based a first and second output. For example, the system may generate for display, on a user interface, a recommendation for a counterfactual explanation to the first prediction based on the first output and the second output. For example, the system may generate for display, on a user interface, a recommendation for the counterfactual explanation to the known alert status. In some embodiments, the counterfactual explanation to the known alert status may indicate a minimal change to the first feature vector that would cause the artificial neural network to change the first prediction.

For example, the counterfactual explanation may be a prediction that describes the smallest change to the feature values that changes the prediction to a predefined output. In one example, a user may apply for a loan. The information about the user (e.g., credit history) may be represented as a feature input into an artificial neural network. If the user's loan is rejected by the artificial neural network, the user may question why. The system may provide a recommendation that includes a counterfactual explanation (e.g., why his/her application was rejected, how he/she might improve a chance at acceptance, etc.). For example, the system may determine and answer to the question of "why". For example, the system may recommend what is the smallest change to the features (income, number of credit cards, age, etc.) that would change the prediction from rejected to approved.

The system may provide a recommendation that includes a counterfactual explanation (e.g., why his/her application was rejected, how he/she might improve a chance at acceptance, etc.). For example, the system may determine and answer to the question of "why". For example, the system may recommend what is the smallest change to the features (income, number of credit cards, age, etc.) that would change the prediction from rejected to approved. For example, in embodiments where the known alert status comprises a detected fraudulent transaction, and the system may identify the occurrence of the known alert status as well as indicating which value (e.g., a given transaction and/or characteristic thereof) triggered the alert. In embodiments where the known alert status comprises a detected cyber incident, and the system may identify the occurrence of the known alert status as well as indicating which value (e.g., an instance of network activity and/or characteristic thereof) triggered the alert. In embodiments where the known alert status comprises a refusal of a credit application, and the system may identify the occurrence of the known alert status, as well as indicating which value (e.g., a given applicant or account value, user history category, regulation criteria, and/or characteristic thereof) triggered the alert. In embodiments where the known alert status comprises a detected identity theft, and the system may identify the occurrence of the known alert status as well as indicating which value (e.g., a transaction and/or characteristic thereof) triggered the alert.

In some embodiments, the system may apply a gradient descent loss function for a probability that the known alert status corresponds to the class of the known alert status to the output from the unified decoder and generating the recommendation based on the probability. For example, the system may apply a gradient descent (e.g., processing an input through a series of small changes that gradually push it toward new values that cause the classifier to change its prediction away from the original class) on the latent encoding using a loss function. In some embodiments, the latent encoding of the first feature vector has an isotropic gaussian distribution. For example, an isotropic distribution is a special type of multidimensional distribution which possesses some of the properties of the spherical multivariate normal distribution. These distributions, often called spherically symmetric distributions, are characterized by their invariance under orthogonal transformation. A Gaussian distribution, also known as the normal distribution, is a probability distribution that is symmetric about the mean, showing that data near the mean are more frequent in occurrence than data far from the mean. In graph form, normal distribution will appear as a bell curve. Gaussian distributions are particularly beneficial because they fit many natural phenomena. In some embodiments, the loss function has a minimum at a decision boundary between two classes of the artificial neural network. For example, the loss function may be a function that maps an event or values of one or more variables onto a real number intuitively representing some "cost" associated with an event. The system may minimize the loss function to minimize the cost.

It is contemplated that the steps or descriptions of FIG. 7 may be used with any other embodiment of this disclosure. In addition, the steps and descriptions described in relation to FIG. 7 may be done in alternative orders, or in parallel to further the purposes of this disclosure. For example, each of these steps may be performed in any order, or in parallel, or substantially simultaneously to reduce lag or increase the speed of the system or method. Furthermore, it should be noted that any of the devices or equipment discussed in relation to FIGS. 1-6 could be used to perform one or more of the steps in FIG. 7.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method for generating recommendations for counterfactual explanations to computer alerts that are automatically detected by a machine learning algorithm, comprising: receiving, using control circuitry, a first feature vector with an unknown alert status, wherein the first feature vector represents values corresponding to a plurality of computer states in a first computer system; inputting, using the control circuitry, the first feature vector into an artificial neural network, wherein the artificial neural network is jointly trained to detect a known alert status based on labeled inputted feature vectors from a training data set corresponding to the known alert status, and to generate, through adversarial training, dimensionally reduced representations of the labeled inputted feature vectors; receiving, using the control circuitry, a first prediction from the artificial neural network, wherein the first prediction indicates whether a latent encoding of the first feature vector corresponds to the known alert status; applying, using the control circuitry, a gradient descent on the latent encoding using a loss function; decoding a higher-dimensional second feature vector, wherein the higher-dimensional second feature vector is a counterfactual explanation; and generating for display, on a user interface, a recommendation for the counterfactual explanation to the known alert status.

2. The method of embodiment, wherein the counterfactual explanation to the known alert status indicates a minimal change to the first feature vector that would cause the artificial neural network to change the first prediction.

3. The method of any one of embodiments 1-2, wherein the first feature vector is tabular data with categorical variables.

4. The method of any one of embodiments 1-3, wherein the latent encoding of the first feature vector has an isotropic gaussian distribution.

5. The method of any one of embodiments 1-4, wherein the counterfactual explanation comprises values within the training data set.

6. The method of any one of embodiments 1-5, wherein the loss function has a minimum at a decision boundary between two classes of the artificial neural network.

7. The method of any one of embodiments 1-6, wherein the known alert status comprises a detected fraudulent transaction, and wherein the values corresponding to the plurality of computer states in the first computer system indicate a transaction history of a user.

8. The method of any one of embodiments 1-7, wherein the known alert status comprises a detected cyber incident, and wherein the values corresponding to the plurality of computer states in the first computer system indicate networking activity of a user.

9. The method of any one of embodiments 1-8, wherein the known alert status comprises a refusal of a credit application, and wherein the values corresponding to the plurality of computer states in the first computer system indicate credit history of a user.

10. The method of any one of embodiments 1-9, wherein the known alert status comprises a detected identity theft, and wherein the values corresponding to the plurality of computer states in the first computer system indicate a user transaction history.

11. A method for generating recommendations for counterfactual explanations to computer alerts that are automatically detected by a machine learning algorithm, comprising: receiving a first feature vector with an unknown alert status, wherein the first feature vector represents values corresponding to a plurality of computer states in a first computer system; inputting the first feature vector into an artificial neural network, wherein the artificial neural network comprises a classifier used to detect a class of a known alert status based on labeled inputted feature vectors from a training data set corresponding to the class of the known alert status, a first autoencoder trained on the class of the known alert status, and a second autoencoder trained on multiple classes of known alert statuses, wherein the multiple classes includes the class of the known alert status and an additional class of known alert statuses; receiving a first prediction from the classifier of the artificial neural network, wherein the first prediction indicates whether the unknown alert status corresponds to the class of the known alert status; receiving a first output from the first autoencoder of the artificial neural network and second output from the second autoencoder of the artificial neural network; and generating for display, on a user interface, a recommendation for a counterfactual explanation to the first prediction based on the first output and the second output.

12. The method of embodiment 11, wherein the counterfactual explanation to the known alert status indicates a minimal change to the first feature vector that would cause the artificial neural network to change the first prediction.

13. The method of embodiment 12, further comprising applying linear interpolation to the first output and the second output to generate a decoder input.

14. The method of embodiment 13, further comprising: inputting the decoder input into a unified decoder, wherein the unified decoder is trained on the multiple classes of the known alert statuses; and receiving an output from the unified decoder.

15. The method of embodiment 14, further comprising: applying a gradient descent loss function for a probability that the known alert status corresponds to the class of the known alert status to the output from the unified decoder; and generating the recommendation based on the probability.

16. The method of embodiment 15, wherein the gradient descent loss function has a minimum at a decision boundary between the class of the known alert status and the additional class of the known alert statuses.

17. The method of embodiment 16, wherein the known alert status comprises a detected fraudulent transaction, and wherein the values corresponding to the plurality of computer states in the first computer system indicate a transaction history of a user.

18. The method of any one of embodiments 11-17, wherein the known alert status comprises a detected cyber incident, and wherein the values corresponding to the plurality of computer states in the first computer system indicate networking activity of a user.

19. The method any one of embodiments 11-17, wherein the known alert status comprises a refusal of a credit application, and wherein the values corresponding to the plurality of computer states in the first computer system indicate credit history of a user.

20. The method any one of embodiments 11-17, wherein the known alert status comprises a detected identity theft, and wherein the values corresponding to the plurality of computer states in the first computer system indicate a user transaction history.

21. A system comprising means for performing any of the steps as described in any of embodiments 1-20.

22. A tangible, non-transitory, machine-readable medium storing instructions that, when executed by a data processing apparatus, cause the data processing apparatus to perform operations comprising those of any of embodiments 1-20.

23. A system comprising: one or more processors; and memory storing instructions that, when executed by the processors, cause the processors to effectuate operations comprising those of any of embodiments 1-20.

What is claimed is:

1. A system for generating recommendations for counterfactual explanations to computer security alerts that are automatically detected by machine learning algorithms monitoring network activity, comprising:

cloud-based memory configured to store a trained artificial neural network comprising: (i) a trained classifier used to detect a class of a known alert status based on labeled inputted feature vectors from a training data set corresponding to a first class of the known alert status and a second class of the known alert status, (ii) a first trained autoencoder trained on the first class, (iii) and a second trained autoencoder trained on multiple classes of known alert statuses including the first class and the second class, and wherein the trained classifier is trained to classify an input into the first class and the second class, wherein the known alert status comprises a detected cyber incident;

cloud-based control circuitry configured to:
      receive a first feature vector associated with an unknown alert status, wherein the first feature vector represents values corresponding to a plurality of computer states in a computer system, and wherein the first feature vector occupies a feature space having a first dimensionality;
      input the first feature vector into the trained artificial neural network;
      responsive to inputting the first feature vector into the trained classifier:
         receive, from the trained classifier, a first prediction that the unknown alert status corresponds to the first class, and a latent representation of the first feature vector in a latent space, wherein the latent space has a smaller dimensionality than the feature space;
      responsive to inputting the latent representation into the first trained autoencoder and the second trained autoencoder:
         receive a first output from the first trained autoencoder comprising a first latent vector and a second output from the second trained autoencoder comprising a second latent vector;
         apply, in the latent space, linear interpolation to the first latent vector of the first output and the second latent vector of the second output to generate a decoder input comprising an interpolated latent vector based on a weighted combination of the first latent vector and the second latent vector; and
         apply, in the latent space, gradient descent to the interpolated latent vector to obtain an adjusted latent vector to correspond to the second class;
      input the adjusted latent vector into a unified decoder trained on the multiple classes of the known alert statuses to map latent representations back to feature vectors in the feature space; and
      receive an output from the unified decoder comprising a second feature vector representing one or more updates to the values corresponding to a smallest change to the first feature vector that causes the trained classifier to output a second prediction corresponding to the second class; and
   cloud-based I/O circuitry configured to generate for display, on a user interface, a recommendation for a counterfactual explanation to the first prediction based on the second feature vector.

2. A method, comprising:

receiving, using control circuitry, a first feature vector with an unknown alert status, wherein the first feature vector represents values corresponding to a plurality of computer states in a computer system;

inputting, using the control circuitry, the first feature vector into a trained artificial neural network comprising (i) a trained classifier used to detect a class of a known alert status, (ii) a first autoencoder trained on a first class of the known alert status, and (iii) a second autoencoder trained on multiple classes of known alert statuses, wherein the multiple classes of known alert statuses comprise the first class and at least a second class of the known alert status;

receiving, using the control circuitry, a first prediction from the trained classifier indicating that the unknown alert status corresponds to the first class and a latent representation of the first feature vector in a latent space having a smaller dimensionality than a feature space of the first feature vector;

receiving, using the control circuitry, a first output from the first autoencoder comprising a first latent vector and a second output from the second autoencoder comprising a second latent vector;

generating an interpolated latent vector based on linear interpolation being applied, in the latent space, to the first latent vector and the second latent vector;

generating an adjusted latent encoding corresponding to the second class based on gradient descent being applied to the interpolated latent vector;

inputting the adjusted latent encoding into a unified decoder trained on the multiple classes to obtain a second feature vector representing one or more updates to the values that causes the trained classifier to output a second prediction corresponding to the second class; and generating, for display on a user interface, a recommendation for a counterfactual explanation to the first prediction based on the second prediction.

3. The method of claim 2, wherein the first feature vector has an isotropic gaussian distribution, and wherein the counterfactual explanation to the known alert status indicates a minimal change to the first feature vector that would cause the trained artificial neural network to change the first prediction.

4. The method of claim 2, wherein the multiple classes comprise multiple classes of the known alert statuses, generating the recommendation comprises:

receiving an output from the unified decoder, the output comprising the second prediction; and determining the counterfactual explanation based on the output.

5. The method of claim 4, wherein the gradient descent being applied to the interpolated latent vector comprises:

applying, to the interpolated latent vector, a gradient descent loss function to determine a probability that the known alert status corresponds to the class of the known alert status as compared to the output from the unified decoder, wherein the recommendation is generated based on the probability.

6. The method of claim 5, further comprising:

determining a minimum at a decision boundary between the first class and the second class for the gradient descent loss function; and determining a distance to the decision boundary.

7. The method of claim 2, wherein the known alert status comprises a detected fraudulent transaction, and wherein the values corresponding to the plurality of computer states in the computer system indicate a transaction history of a user.

8. The method of claim 2, wherein the known alert status comprises a detected cyber incident, and wherein the values corresponding to the plurality of computer states in the computer system indicate networking activity of a user.

9. The method of claim 2, wherein the known alert status comprises a refusal of a credit application, and wherein the values corresponding to the plurality of computer states in the computer system indicate credit history of a user.

10. The method of claim 2, wherein the known alert status comprises a detected identity theft, and wherein the values corresponding to the plurality of computer states in the computer system indicate a user transaction history.

11. One or more non-transitory computer-readable media comprising instructions that, when executed by one or more processors, cause operations comprising:

receiving a first feature vector with an unknown alert status, wherein the first feature vector represents values corresponding to a plurality of computer states in a computer system;

inputting the first feature vector into a trained artificial neural network comprising (i) an agnostic classifier used to detect a class of a known alert status, (ii) a first autoencoder trained on a first class of the known alert status, and (ii) a second autoencoder trained on multiple classes of known alert statuses comprising the first class and at least a second class of the known alert status;

receiving (a) from the agnostic classifier, (a)(i) a first prediction from the agnostic classifier indicating that the unknown alert status corresponds to the first class and (a)(ii) a latent representation of the first feature vector in a latent space having a smaller dimensionality than a feature space of the first feature vector, (b) a first output from the first autoencoder comprising a first latent vector, and (c) second output from the second autoencoder comprising a second latent vector;

generating an interpolated latent vector based on linear interpolation being applied, in the latent space, to the first latent vector and the second latent vector;

inputting an adjusted latent vector corresponding to the second class, generated based on gradient descent being applied to the interpolated latent vector, into a unified decoder trained on the multiple classes to obtain a second feature vector representing one or more updates to the values that causes the agnostic classifier to output a second prediction corresponding to the second class; and generating, for display on a user interface, a recommendation for a counterfactual explanation to the first prediction based on the second prediction.

12. The one or more non-transitory computer-readable media of claim 11, wherein the counterfactual explanation to the known alert status indicates a minimal change to the first feature vector that would cause the trained artificial neural network to change the first prediction.

13. The one or more non-transitory computer-readable media of claim 11, wherein the multiple classes comprise multiple classes of the known alert statuses, generating the recommendation comprises:

receiving an output from the unified decoder comprising the second prediction; and determining the counterfactual explanation based on the output.

14. The one or more non-transitory computer-readable media of claim 13, wherein the gradient descent being applied to the interpolated latent vector comprises:

applying, to the interpolated latent vector a gradient descent loss function to determine a probability that the known alert status corresponds to the class of the known alert status as compared to the output from the unified decoder, and wherein the gradient descent loss function has a minimum at a decision boundary between the first class and the second class, wherein the recommendation is generated based on the probability.

15. The one or more non-transitory computer-readable media of claim 11, wherein the known alert status comprises a detected fraudulent transaction, and wherein the values corresponding to the plurality of computer states in the computer system indicate a transaction history of a user.

16. The one or more non-transitory computer-readable media of claim 11, wherein the known alert status comprises a detected cyber incident, and wherein the values corresponding to the plurality of computer states in the computer system indicate networking activity of a user.

17. The one or more non-transitory computer-readable media of claim 11, wherein the known alert status comprises a refusal of a credit application, and wherein the values corresponding to the plurality of computer states in the computer system indicate credit history of a user.

18. The one or more non-transitory computer-readable media of claim 11, wherein the known alert status comprises a detected identity theft, and wherein the values corresponding to the plurality of computer states in the computer system indicate a user transaction history.

\* \* \* \* \*